Patented July 16, 1929.

1,720,712

UNITED STATES PATENT OFFICE.

JOSEPH B. ARMITAGE, OF MILWAUKEE, WISCONSIN, ASSIGNOR TO KEARNEY & TRECKER CORPORATION, OF WEST ALLIS, WISCONSIN.

MACHINE-TOOL ATTACHMENT.

Application filed September 26, 1927. Serial No. 221,946.

This invention relates to attachments for machine tools, and more particularly to an attachment providing a supplementary tool spindle power operable from the main spindle of the machine and having a variety of adjustments relative to the machine spindle.

An object is to provide such an attachment with a greater space economy and convenience of operation than heretofore.

Another object is to provide adjustments in great variety with relatively simple and compact mechanism in an attachment of minimum weight for convenience of removing and replacing the attachment.

Another object is to simplify and improve a driving train for actuating an attachment spindle from a relatively movable machine tool spindle.

Another object is generally to simplify and improve the construction and operation of spindle carrying machine tool attachments.

The invention consists of the arrangement herein illustrated, described and claimed and is to be understood to include such modifications as may be the equivalent of the structure claimed.

Figure 1:
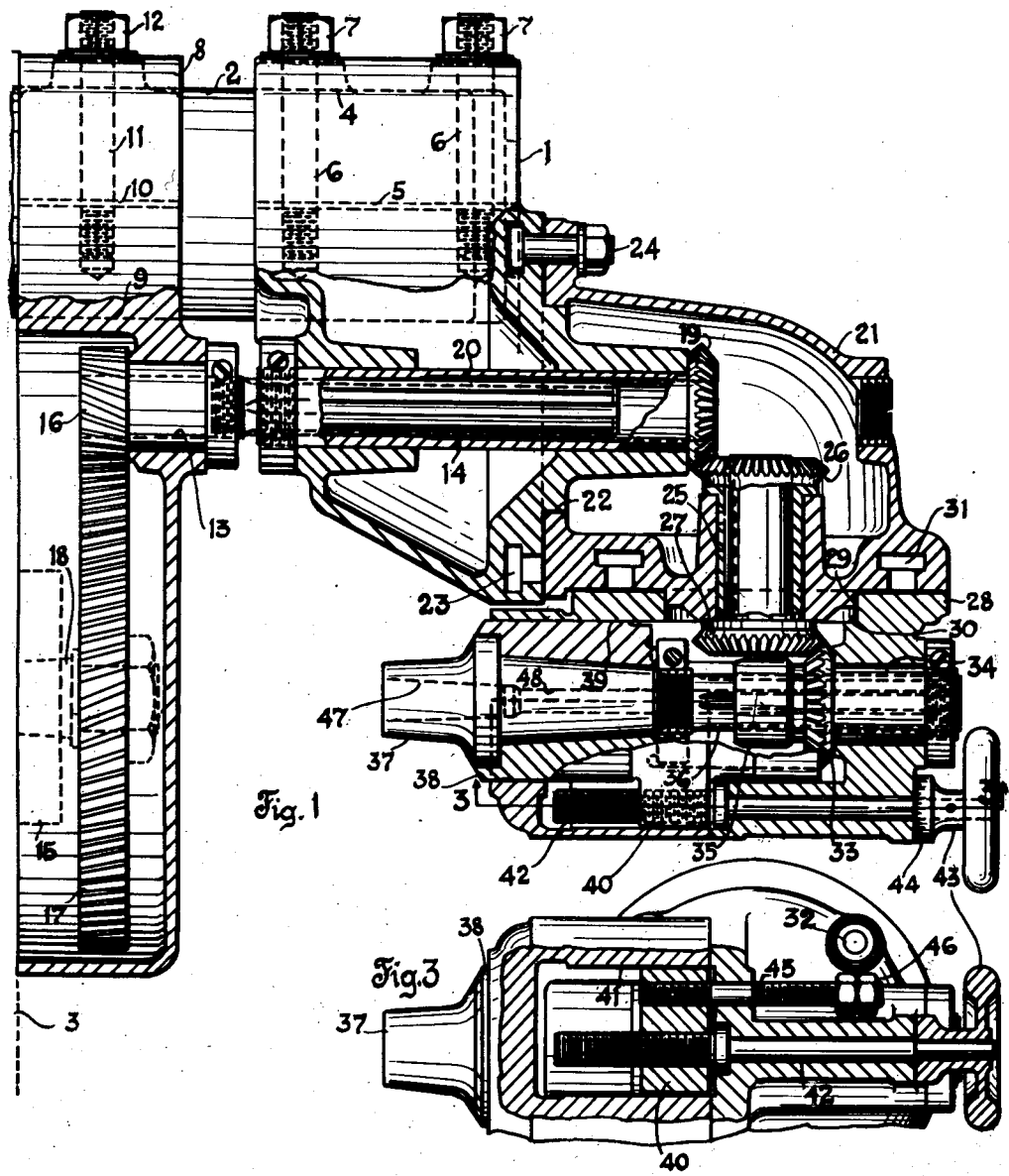
Figure 2:
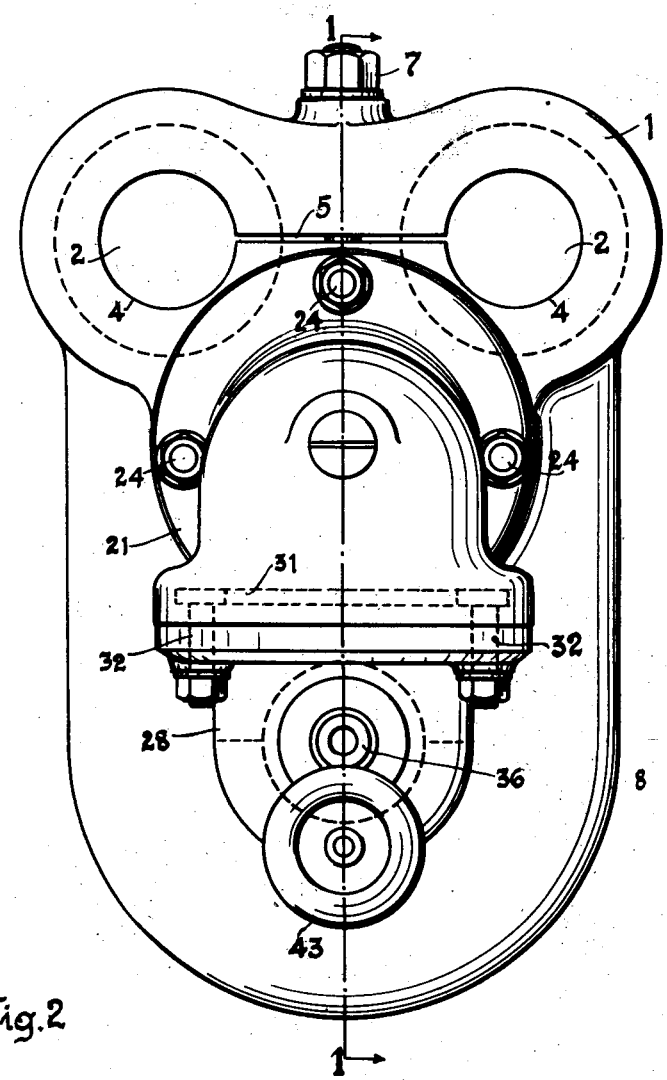

In the drawings like reference characters have been used to denote the same parts in all the views, of which Fig. 1 is a side elevation of an attachment embodying the invention, mainly in section along line 1—1 of Fig. 2.

Fig. 2 is a front elevation of the same attachment.

Fig. 3 is a partial bottom view, partially in section along line 3—3 of Fig. 1.

A member 1 is removably clamped to a plurality of parallel overarms 2, which are adjustably fixed in the usual manner in the column of the machine tool, which in this instance is a horizontal milling machine, a portion of the column being shown at 3, Fig. 1. Suitable parallel bores 4 in the member 1 receive the overarms and accurately position the member therefrom. A slot 5 connects the bores whereby the bores may each be contracted by the means of studs 6 and nuts 7 to clamp the member in such position. A member 8 is similarly removably aligned and clamped on the overarms 2 by the means of bores 9, slot 10, stud 11 and nut 12. Member 8 rotatably supports a shaft 13 spaced materially above spindle 15 and positioned with its axis parallel with arms 2 and approximately centrally positioned underneath the arms. Fixed on the shaft is a pinion 16 meshed with a gear 17 supported and driven from the spindle 15 of the milling machine by any suitable means, in this instance a short arbor 18. The overarms 2 serve to space and align pinion 16 for correct mesh with gear 17. Rotatably supported in member 1 is a bevel gear 19 having an elongated shank 20 adjustably receiving through a splined axial bore therein, the splined extended end 14 of shaft 13. The overarms 2 position the splined bore of shank 20 in exact alignment with the splined end 14 and the overarms being adjustable in the column and through the bores 9 of member 8, permit of relative adjustment of members 8 and 1 while maintaining such alignment. A member 21 is swiveled on member 1 about the axis of bevel gear 19 being located by the means of a circular lug 22 engaging in a closely fitting bore as shown in Fig. 1. Member 21 may be clamped in any position of swivel adjustment by the means of a circular T slot 23 engaged by T bolts 24. A shaft 25 is rotatably supported from member 21 and has fixed thereon a bevel gear 26, adapted to mesh with gear 19 in any swivel position, and a bevel gear 27. A member 28 is swiveled on member 21, being located by the means of a circular lug 29 engaging in a closely fitting bore 30 as shown in Fig. 1. Member 28 may be clamped in any position of swivel adjustment by the means of a circular T slot 31 and T bolts 32. A bevel gear 33 is rotatably supported by its hub 34 from member 28 to mesh with bevel gear 27 in any swivel position. The hub 34 has a forward extension 35 and is provided with a splined bore adapted to adjustably receive the splined end 36 of a spindle 37 rotatably supported in a bearing box 38. Bearing box 38 is adjustably fitted in a bore 39 in the member 28 for movement with spindle 37 in an axial direction and provided with an ear or lug 40 slidably fitting a recess 41 in the member, whereby the bearing box is prevented from turning in the bore. A screw 42, rotatably fixed against axial movement in the member 28, is in threaded engagement with the lug 40 as shown in Figs. 1 and 3, and is provided with a rotating means or knob 43 having a graduated dial 44 whereby a predetermined axial movement of spindle 37 relative to unit 28 may be manually established. A stop screw 45 (Fig. 3) fixed in the lug 40 is provided with adjustable stop nuts 46 whereby the spindle may be retracted and again advanced to a given position without reference to the dial 44. Spindle 37 is provided with a tool supporting and driving taper bore 47 and with an axial through bore 48 for driving out tool shanks from the taper bore.

The gear pair 16—17 are of size adapted to transmit a relatively high speed from machine spindle 15 to the shaft 13, which is maintained through the transmission, the gear pairs 19—26 and 27—33 being of substantially the same size in a given pair, whereby a condition of small torque is maintained in the transmission permitting relatively light and compact mechanism. Any misalignment of shaft 13 with its receiving bore is prevented by supporting and aligning the members 1 and 8 from the parallel overarms, and the misalignment or incorrect positioning of pinion 16 and gear 17 is prevented by the same means, while permitting easy removal of both units or relative adjustment between them. The various members 1—8—21—28 form housings protecting the operator from the transmission in any position of adjustment.

Having now fully revealed the invention, what is claimed is:

1. In an attachment for machine tools having an adjustable overarm structure and a main spindle, the combination of a tool spindle supported from said structure for adjustment therewith and also about a pivot axially parallel with the other adjustment, and a transmission train from said main spindle to said tool spindle including an extensible coupling concentric with said pivot axis, said coupling including a plurality of members relatively axially movable during structure adjustment, and means associated with said overarm structure for maintaining said members in exact alignment during adjustment of said structure.

2. In an attachment for milling machines having a plurality of adjustable overarms and a main spindle, the combination of a tool spindle rotatably supported for adjustment with said overarms and for adjustment about a plurality of pivots, one of which is axially parallel with the path of overarm adjustment, and transmission mechanism for actuating said tool spindle including in the order recited a gear fixed with said main spindle, a pinion meshed therewith, an extensible coupling including a shaft having its axis coincident with the axis of the last mentioned pivot, a shaft having its axis coincident with the axis of the other pivot, and an extensible coupling comprising driving and driven members rotatable about the same axis as said tool spindle, together with means for the axial adjustment of said tool spindle.

3. The combination with a machine tool having a plurality of overarms spaced apart, of a member removably supported from said overarms, said member providing sockets adapted to receive said arms and a slot connecting the one socket with the other, and clamp means adapted to contract said slot whereby to simultaneously contract said sockets into frictional engagement with the respective arms.

4. In a machine tool, the combination of a column, a main spindle journaled therein, an overarm structure above said spindle and adjustable to project from said column, a support fixed with the projecting portion of said overarm for adjustment therewith, a housing pivoted on said support, a tool spindle journaled in said housing, and transmission mechanism connecting said spindles, including coaxial coupling members arranged for relative axial movement during overarm adjustment in a direction parallel with the path of overarm adjustment, said overarm and column having cooperating guide surfaces preventing movement therebetween except in a direction parallel with the axis of said members, whereby to maintain said members in exact alignment during said adjustment.

5. In a machine tool, the combination of a column, a main spindle journaled therein, an overarm structure above said spindle and adjustable to project from said column, a support fixed with the projecting end of said overarm for adjustment therewith, a housing pivoted on said support for movement about an axis parallel with the axis of said main spindle, a tool spindle journaled in said housing, and transmission mechanism connecting said spindles including coaxial coupling members relatively movable along said pivot axis, said overarm and column having cooperating guide surfaces preventing movement therebetween except in a direction parallel to said pivot axis whereby to maintain said members in exact alignment during said adjustment.

6. In a machine tool the combination of a column, a main spindle journaled therein, an overarm structure above said spindle including a plurality of overarms spaced apart and separately adjustable to project from said column, a support fixed with projecting ends of said overarms whereby said support and both overarms are adjustable as a unit, a housing pivoted on said support for movement about an axis parallel with the path of movement of said unit, a tool spindle journaled in said housing, and transmission mechanism connecting said spindles including coaxial coupling members relatively movable along said pivot axis during adjustment of said unit, the overarm arrangement described forming means for maintaining the axial alignment of said coupling members during such adjustment.

7. In a machine tool, the combination of a column, a main spindle journaled therein, an overarm structure above said spindle including a plurality of overarms spaced apart and separately adjustable to project from said column, a support fixed with the projecting ends of said overarms whereby said support and both overarms are adjustable as a unit, a tool spindle rotatably supported from said support, and transmission mechanism connecting said spindles including co-axial coupling members relatively axially movable along a path parallel with the path of adjustment of said unit, the overarm arrangement described forming means for maintaining the axial alignment of said coupling members during such adjustment.

8. In an attachment for milling machines having a rotatable main spindle and an overarm positioned above said main spindle and adjustable in a path parallel with the axis of said spindle, the combination of a member supported on said overarm for adjustment therewith, a tool spindle supported from said member for pivotal movement and for axial adjustment, and a power train connecting said spindles including in the order recited a relatively large gear fixed on said main spindle, a relatively small pinion meshed therewith, a coupling extensible in a direction parallel with the path of adjustment of said overarm, a pair of bevel gears adapted for pivotal movement of the one about the axis of the other, and a coupling extensible in the direction of axial adjustment of said tool spindle.

9. In an attachment for milling machines having a rotatable main spindle and an overarm positioned above said main spindle and adjustable in a path parallel with the axis of said spindle, the combination of a first support member fixed on said overarm for adjustment therewith, a second support member carried by said first member and pivoted therewith for adjustment about an axis parallel with the path of overarm adjustment, a third support member carried by said second member and pivoted therewith for movement about an axis transverse to the axis of the pivot of said second member, a tool spindle carried by said third member and axially adjustable relative thereto, and a power train connecting said spindles including in the order recited a gear fixed on said main spindle, a pinion meshed with said gear, a coupling extensible in a direction parallel with the path of overarm adjustment, meshed bevel gears adapted to permit movement about the pivot of said second member, meshed bevel gears adapted to permit movement about the pivot of said third member, and a coupling extensible in the direction of the axial movement of said tool spindle.

In witness whereof I hereto affix my signature.

JOSEPH B. ARMITAGE.